3,672,822
CORROSION INHIBITING ENVIRONMENT FOR ALUMINUM
Willem Vedder, Latham, and David A. Vermilyea, Schenectady, N.Y., assignors to General Electric Company
No Drawing. Filed Dec. 3, 1969, Ser. No. 881,854
Int. Cl. C23f 11/02
U.S. Cl. 21—2.5       3 Claims

ABSTRACT OF THE DISCLOSURE

Aluminum can be protected against corrosion by providing a vapor phase inhibiting environment for the aluminum comprising a hydrolyzable volatile organic phosphate.

BACKGROUND OF THE INVENTION

Aluminum exposed to air at temperatures up to about 400° C. rapidly becomes covered with a layer of aluminum oxide, which is less than 100 A. thick and is usually described as amorphous. Thus, unless special precautions are taken aluminum is always covered with this oxide layer. The initially rapid growth of this so-called "barrier layer" soon slows and the thickness then increases approximately as the logarithm of time. The presence of water in the atmosphere has no obvious influence on this growth, at least on the short time behaviour. Oxide films which are apparently similar to the air-formed films, can be grown anodically in liquid water. At ambient pressure and temperatures from 500° C. to the melting point of aluminum the reaction product is a mixture of amorphous aluminum oxide and crystalline aluminum oxide, whose maximum thickness is no more than a few hundred angstroms. Although water does increase the initial reaction rate at these higher temperatures, the thickness reached after about 1 hour is the same in gases with or without water, and the subsequent reaction rate is extremely small. In high pressure steam, the results are similar except for a rapid grain boundary attack at temperatures just above the critical point for water.

Aluminum oxidation in liquid water, however, is remarkably different from that in gases. In liquid water the reaction continues beyond the oxidation step and a layer of aluminum hydroxide is formed. The rate of growth of the aluminum hydroxide layer decreases much less rapidly than that of the oxide barrier layer and may reach a thickness of several microns at 100° C. The air or oxygen content of the water or the presence of externally applied potentials appear to make little difference in the formation rate of the hydroxide at 100° C. Grain boundary attack by this mechanism, more pronounced in pure than in impure aluminum, occurs at temperatures of 100° C. or greater.

The essential steps in the aluminum/water reaction are (a) amorphous oxide formation; (b) dissolution of the amorphous oxide; and (c) precipitation of aluminum hydroxide. The hydroxide layer consists of platelets having a thickness of less than 100 A. and probably no greater than a few lattice parameters.

This corrosion mechanism has a very destructive impact, therefore, whenever aluminum is exposed to an environment in which the condensation of liquid water occurs on the aluminum surface. The destructive reaction can most readily occur in small crevices, or cavities, in the aluminum such as exist between parts joined by means of mechanical fasteners or within small pores, such as are formed in electrochemically etched aluminum foil used as electrodes in electrolytic capacitors. When aluminum containing such crevices and pores must be exposed (or stored) in a moist environment, especially one in which temperature fluctuations occur, condensation may occur in the pores and crevices thereby precipitating corrosion of the aluminum according to the aluminum/water reaction described hereinabove.

The art is, therefore, in need of a solution to this problem particularly for the protection of structures and devices wherein the removal by corrosion of a layer of aluminum of even less than 1 micron in thickness would be very detrimental, e.g. aluminized mirrors, electrochemically etched foil, and highly finished aluminum parts.

In describing this invention the term "inhibition" is employed. This term is defined as follows:

Inhibition is the rendering innocuous of a normally hostile environment by the addition of substances to the environment.

SUMMARY OF THE INVENTION

In response to this need in the art the method of this invention has been discovered whereby aluminum can be protected against corrosion by the provision of a vapor phase inhibitor in the atmosphere surrounding the structure or device. The preferred vapor phase inhibitor is a volatile, water-soluble organic phosphate, for example, a volatile alkyl phosphate.

DESCRIPTION OF THE PREFERRED EMBODIMENT

It is known that phosphates in small concentrations (less than 10 p.p.m.) inhibit the reaction of aluminum films with liquid water. However, it has not heretofore been recognized that the corrosion of aluminum bodies exposed to a gaseous environment containing moisture may be inhibited by the use of hydrolyzable, volatile organic phosphates to provide a potential source of phosphate ions in the moisture-laden atmosphere. If the gaseous environment contains such a volatile organic phosphate, then, should water condensation occur due to temperature fluctuations, the organic phosphate will be immediately available for dissolution in the liquid water as the water forms whereupon phosphate ions are liberated and become adsorbed over the surface of the aluminum body to prevent the formation of aluminum hydroxide. This aqueous phosphate solution inhibits the corrosion of aluminum as long as the liquid water remains present. Should the atmospheric conditions alter so that the liquid water becomes a vapor once again, dilute phosphoric acid reacts with the aluminum to form an insoluble aluminum compound.

Separate glass slides were coated with layers of aluminum by vapor deposition. One sample was exposed at 50° C. to air saturated with water vapor while the second sample was exposed to air saturated with water vapor and containing trimethylphosphate vapors. Oxidation of the aluminum for the two samples was compared and it was found that the oxidation reaction of the aluminum in the presence of the organic phosphate vapors was slower than in the absence of the phosphate by 1 to 2 orders of magnitude ($\frac{1}{10}$ to $\frac{1}{100}$ as much oxidation).

In the practice of this invention storage chambers for highly finished aluminum parts assembled with mechanical fasteners, aluminized mirrors or electrochemically etched foil, for example, would contain or have in flow communication therewith a source of a volatile organic phosphate such as trimethylphosphate, diethyl phosphate, triisobutyl phosphate, tripropyl phosphate, triphenyl pospate, tri(2-tolyl)phosphate and tris (2,4-dimethyl phenyl) phosphate, for example.

Similarly, aluminum surfaces, which are confined in spaces havng moist environments during use may be protected in this manner.

The protective mechanism, therefore, consists of the adsorption of phosphate ions (dissolved in the liquid water) on the aluminum oxide layer, which adsorbed ions prevent hydroxide formation.

The organic phosphates useable in the practice of this invention may be either an aliphatic or an aromatic phosphate and should have a vapor pressure (at the desired storage or operating temperature) in the range from about 0.1 mm. of mercury to about 10 mm. of mercury. The storage or operating temperature must, of course, be between 0° C. and 100° C., the range in which liquid water may normally be encountered. Further, the phosphate must be sufficiently soluble in water to provide a concentration of at least about $10^{-5}$ moles/liter of phosphate ions.

One specific application for this invention is in safeguarding the sterilization procedure for the thermal insulation of space vehicles. Such thermal insulation is typically formed as a blanket consisting of as many as 35 layers of thin plastic material covered with very thin (1000 A.) films of aluminum. The sterilization procedure consists of a number of 30-hour long exposures of the insulation at 50° C. to a gaseous mixture containing ethylene oxide, dichlorodifluoromethane and water vapor. Such treatment would ordinarily corrode the aluminum and impair or destroy the thermal benefit to be gained from the aluminum layer. The introduction of vapors of a hydrolyzable volatile organic phosphate into the gas mixture used for the sterilization will greatly minimize corrosion of the aluminum film covering the plastic layers.

What we claim as new and desire to secure by Letters Patent of the United States is:

1. A method for providing a protective atmosphere for aluminum surfaces contained in an enclosure comprising the step of providing a quantity of liquid consisting essentially of a hydrolyzable, volatile organic phosphate in communication with the interior of said enclosure whereby phosphate vapor may freely enter said enclosure, said organic phosphate having a vapor pressure at the temperature of the protective atmosphere of at least about 0.1 mm. of mercury and being sufficiently soluble in water to provide a concentration of at least about $10^{-5}$ moles/liter of phosphate ions.

2. The method recited in claim 1 wherein the volatile organic phosphate is an alkyl phosphate.

3. The method recited in claim 2 wherein the alkyl phosphate is trimethylphosphate.

References Cited

UNITED STATES PATENTS

| | | | |
|---|---|---|---|
| 2,416,734 | 3/1947 | Boggs et al. | 21—2.5 X |
| 2,562,549 | 7/1951 | Hatch | 21—2.7 UX |
| 2,643,177 | 6/1953 | Wachter et al. | 21—2.5 |
| 2,717,843 | 9/1955 | Wachter et al. | 21—2.5 X |
| 2,848,298 | 8/1958 | Ross et al. | 21—2.5 |
| 3,433,577 | 3/1963 | Shick | 21—2.5 |

FOREIGN PATENTS

| | | | |
|---|---|---|---|
| 647,200 | 12/1950 | Great Britain | 21—2.5 |

MORRIS O. WOLK, Primary Examiner

B. S. RICHMAN, Assistant Examiner

U.S. Cl. X.R.

252—389